(12) United States Patent
Watson et al.

(10) Patent No.: US 8,590,653 B2
(45) Date of Patent: Nov. 26, 2013

(54) REGENERATIVE BRAKING FOR GAS TURBINE SYSTEMS

(75) Inventors: John D. Watson, Evergreen, CO (US); Frank Wegner Donnelly, North Vancouver (CA)

(73) Assignee: ICR Turbine Engine Corporation, Hampton, NH (US)

( * ) Notice: Subject to any disclaimer, the term of this patent is extended or adjusted under 35 U.S.C. 154(b) by 0 days.

(21) Appl. No.: 13/545,551

(22) Filed: Jul. 10, 2012

(65) Prior Publication Data

US 2012/0279231 A1 Nov. 8, 2012

Related U.S. Application Data

(62) Division of application No. 12/405,934, filed on Mar. 17, 2009, now Pat. No. 8,215,437.

(60) Provisional application No. 61/037,039, filed on Mar. 17, 2008.

(51) Int. Cl.
    *B60L 11/16* (2006.01)
(52) U.S. Cl.
    USPC ........................................ 180/165; 180/65.31
(58) Field of Classification Search
    USPC .................. 60/39.511, 39.512, 728; 165/10, 165/104.14; 180/165, 65.31; 903/947
    See application file for complete search history.

(56) References Cited

U.S. PATENT DOCUMENTS

| | | | |
|---|---|---|---|
| 2,339,185 A * | 1/1944 | Nettel | 290/14 |
| 2,914,917 A | 12/1959 | Van Nest | |
| 3,080,706 A | 3/1963 | Flynn, Jr. et al. | |
| 3,624,356 A | 11/1971 | Havill | |
| 4,089,176 A | 5/1978 | Ashe | |
| 4,366,784 A | 1/1983 | Paul | |
| 4,414,805 A | 11/1983 | Walker | |
| 4,509,333 A | 4/1985 | Nussdorfer et al. | |
| 5,121,607 A | 6/1992 | George, Jr. | |
| 5,129,328 A * | 7/1992 | Donnelly | 105/61.5 |
| 5,329,757 A | 7/1994 | Faulkner et al. | |
| 5,450,724 A | 9/1995 | Kesseli et al. | |
| 5,488,823 A | 2/1996 | Faulkner et al. | |
| 5,564,270 A | 10/1996 | Kesseli et al. | |
| 5,586,429 A | 12/1996 | Kesseli et al. | |
| 5,609,655 A | 3/1997 | Kesseli et al. | |
| 5,634,339 A | 6/1997 | Lewis et al. | |
| 5,873,250 A * | 2/1999 | Lewis et al. | 60/650 |
| 5,983,992 A | 11/1999 | Child et al. | |

(Continued)

FOREIGN PATENT DOCUMENTS

EP 1540156 10/2006

OTHER PUBLICATIONS

Zimmerman, "Submarine Technology for the 21st Century", Second Edition, 2006, pp. 50-51.

(Continued)

*Primary Examiner* — Joseph Rocca
*Assistant Examiner* — Laura Freedman
(74) *Attorney, Agent, or Firm* — Sheridan Ross P.C.

(57) ABSTRACT

The present invention is directed to an energy storage system comprised of a heat block having a relatively high specific energy capacity. The heat block can be used, for example, with a regenerative braking system for gas turbine powered vehicles to improve fuel efficiency.

7 Claims, 14 Drawing Sheets

(56) References Cited

U.S. PATENT DOCUMENTS

| | | | |
|---|---|---|---|
| 5,992,139 | A | 11/1999 | Kesseli |
| 5,994,681 | A | 11/1999 | Lloyd |
| 6,305,079 | B1 | 10/2001 | Child et al. |
| 6,313,544 | B1 | 11/2001 | Mongia et al. |
| 6,598,400 | B2 | 7/2003 | Nash et al. |
| 6,606,864 | B2 | 8/2003 | Mackay |
| 6,651,433 | B1 | 11/2003 | George, Jr. |
| 6,895,760 | B2 | 5/2005 | Kesseli |
| 6,955,052 | B2 | 10/2005 | Primlani |
| 7,304,445 | B2 * | 12/2007 | Donnelly ............... 318/108 |
| 7,325,401 | B1 | 2/2008 | Kesseli et al. |
| 7,330,012 | B2 * | 2/2008 | Ahmad et al. ............ 318/811 |
| 7,393,179 | B1 | 7/2008 | Kesseli et al. |
| 7,518,254 | B2 | 4/2009 | Donnelly et al. |
| 7,723,932 | B2 | 5/2010 | King et al. |
| 7,861,510 | B1 | 1/2011 | Wilson, Jr. et al. |
| 7,940,016 | B2 | 5/2011 | Donnelly et al. |
| 8,215,437 | B2 * | 7/2012 | Watson et al. ............ 180/165 |
| 2005/0251299 | A1 | 11/2005 | Donnelly et al. |
| 2006/0001399 | A1 | 1/2006 | Salasoo |
| 2006/0213703 | A1 | 9/2006 | Long |
| 2007/0209365 | A1 | 9/2007 | Hamer et al. |
| 2008/0182466 | A1 | 7/2008 | Wegner-Donnelly et al. |
| 2008/0290825 | A1 | 11/2008 | St-Jacques et al. |
| 2010/0288571 | A1 | 11/2010 | Dewis et al. |

OTHER PUBLICATIONS

Janes, "A Fully Enhanced Gas Turbine for Surface Ships" ASME Paper 96-GT-527, Presented at the International Gas Turbine and Aeroengine Congress & Exhibition, Birmingham, UK Jun. 10-12, 1996, 11 pgs.

Data Sheet Rev: 807, "Heavy Duty Permanent Magnet Motor/Generator 'HPM1000'," US Hybrid Corporation, Aug. 19, 2006, 2 pages.

Background of the Invention for the above-captioned invention (previously provided).

International Search Report for International (PCT) Patent Application No. PCT/US2009/037432, mailed May 14, 2009.

Written Opinion for International (PCT) Patent Application No. PCT/US2009/037432, mailed May 14, 2009.

International Preliminary Report on Patentability for International (PCT) Application No. PCT/US2009/037432, mailed Sep. 30, 2010.

Notice of Allowance for U.S. Appl. No. 12/405,934 mailed Mar. 8, 2012, 7 pages.

Official Action for U.S. Appl. No. 12/405,934 mailed Jul. 29, 2011, 14 pages.

Official Action for U.S. Appl. No. 12/405,934 mailed Mar. 15, 2011, 7 pages. Restriction Requirement.

* cited by examiner

REGENERATIVE BRAKING FOR GAS TURBINE SYSTEMS

CROSS REFERENCE TO RELATED APPLICATIONS

This application is a Divisional of U.S. patent application Ser. No. 12/405,934, filed Mar. 17, 2009, now U.S. Pat. No. 8,215,437, that claims the benefit of U.S. Provisional Application Ser. No. 61/037,039, filed Mar. 17, 2008, entitled "Regenerative Braking Method for Vehicles," the entirely of which are incorporated by reference herein.

FIELD

The present invention relates generally to a thermal energy storage system suitable for power systems using gas turbines and specifically for application to regenerative braking in gas-turbine powered vehicles.

BACKGROUND

The world requires ever-increasing amounts of fuel for vehicle propulsion. Means of utilizing fuels needs to be accomplished more efficiently and with substantially lower carbon dioxide emissions and air pollutants such as NOxs. For vehicles powered by gas turbines, a new means of energy storage can recover substantial amounts of energy normally discarded in braking Gas turbines can be used in vehicles where they have the additional advantage of being highly fuel flexible and fuel tolerant. For example, gas turbines can be operated on a variety of fuels such as diesel, gasoline, ethanol, methanol, natural gas, biofuels and hydrogen. The efficient utilization of gas turbines can be improved by a high specific-energy storage means that can efficiently transfer stored heat energy, acquired by a regenerative braking system, to a gas turbine engine when required.

There remains a need for a compact, high-capacity energy storage system that can be used in conjunction with gas turbine engines to improve the overall fuel efficiency and reduce emissions.

SUMMARY

These and other needs are addressed by the various embodiments and configurations of the present invention which are directed generally to an efficient energy storage method compatible with gas turbines, and specifically to energy storage systems for regenerative braking in gas turbine powered vehicles.

Vehicles that may be powered by gas turbine engines and a regenerative braking system based on storing thermal energy include but are not limited to trucks, cars, SUVs, locomotives, buses and off-road vehicles such as for example material haulage and dump trucks.

In a first embodiment, an energy storage system includes:
(a) a heat block in thermal communication with at least one an energy source, wherein the heat block is configured to store thermal energy;
(b) a thermally insulative enclosure surrounding the at least one heat block; and
(c) a heat exchanger in thermal communication with the at least one heat block to transfer heat from the heat block to a working fluid.

In a second embodiment, an energy storage system includes:

(a) a heat block, having a first energy storage capacity and a first storage temperature, in thermal communication with an energy source, wherein the heat block is configured to store thermal energy;
(b) an intermediate storage block, having a second energy storage capacity and a second storage temperature, in thermal communication with the heat block, wherein at least one of the following is true:
  (B1) the first energy storage capacity is equal to or greater than the second energy storage capacity;
  (B2) the first storage temperature is greater than the second storage temperature; and
  (B3) a melting point of the heat block is equal to or greater than a melting point of the intermediate storage block; and
(c) a thermally insulative enclosure surrounding the heat block and the intermediate storage block.

The heat block (or heat blocks in thermal communication with each other) may be blocks of solid material or compressed granular material. The heat block storage systems may be made in rectangular, square, cylindrical or spherical geometries. The heat blocks can be made of an appropriate material such as carbon (especially graphite), boron nitride, boron carbide, silicon carbide, silicon dioxide, magnesium oxide, alumina and the like. These are materials that have high specific heats as well has high melting temperatures. Heat can be added to heat block by any one of electrical heating, heat transfer by solid conductors or heat transfer by circulating fluids. Heat can be extracted from a heat block preferably using heat transfer by circulating fluids. The output heat transfer fluids can be used to deliver energy typically through a heat exchanger to the working gas of a gas turbine.

An intermediate storage transfer block is typically used to temporarily store heat energy at a lower temperature than the temperature of the primary heat storage block and has the function of transferring heat energy to a heat transfer fluid at a temperature compatible with its heat exchanger materials. An intermediate storage transfer block may be made of the same material as the main heat storage block or it may have a lower specific energy capacity and melting temperature than the main heat storage block.

In a third embodiment, a heat block is used to recover energy from a vehicle braking system. The regenerative braking system includes:
(a) a gas turbine engine;
(b) one or more of a plug-in to a power grid, an electrical generator and a braking system, the a plug-in to a power grid generating electrical energy when the engine is not operating, the electrical generator generating electrical energy when the engine is idling and the braking system generating electrical energy when braking; and
(c) a resistive grid to transform the electrical energy into thermal energy by resistive dissipation;
(d) at least one heat block in thermal communication with the resistive grid to absorb the thermal energy, and.
The heat block is in thermal communication with the at least one gas turbine engine.

This energy is stored in the heat block and, when required, can be used to add heat energy through a heat exchanger to the working fluid of a gas turbine engine for any number of gas turbine configurations so as to reduce the energy normally provided by a combustor or provide all of the energy normally provided by a combustor.

In a preferred configuration of this embodiment, a heat block is used to provide energy storage for an intercooled recuperated gas turbine system for a vehicle with a mechanical or hydraulic transmission, wherein a permanent magnet motor/generator is used to brake the vehicle by its drive shaft to provide regenerative braking energy to a heat block.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Dynamic braking is implemented when the electric motors are used in generator mode during braking to provide all or a portion of the braking force for a vehicle. The electrical energy generated is typically dissipated in a resistance grid system.

Energy density as used herein is energy per unit volume (joules per cubic meter).

An energy storage system refers to any apparatus that acquires, stores and distributes thermal, mechanical or electrical energy which is produced from another energy source such as a prime energy source, a regenerative braking system, or any source of renewable or fuel-based energy. Examples are a heat block, a battery pack, a bank of capacitors, a compressed air storage system and a bank of flywheels or a combination of storage systems.

An engine refers to any device that uses energy to develop mechanical power, such as motion in some other machine. Examples are diesel engines, gas turbine engines, microturbines, Stirling engines and spark ignition engines.

A heat block is a solid or granular volume of material with a high heat capacity and high melting temperature to which heat can be added by one of more of electrical resistive heating, inductive heating, solid conductors, or a heat transfer fluid, and from which heat can be extracted by a heat transfer fluid.

A hybrid vehicle combines an energy storage system, a prime power unit, and a vehicle propulsion system. A parallel hybrid vehicle is configured so that propulsive power can be provided by the prime power source only, the energy storage source only, or both. In a series hybrid vehicle, propulsive power is provided by the energy storage unit only and the prime power source is used to supply energy to the energy storage unit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

A permanent magnet motor is a synchronous rotating electric machine where the stator is a three-phase stator, like that of an induction motor, and the rotor has surface-mounted permanent magnets. In this respect, the permanent magnet synchronous motor is equivalent to an induction motor where the air gap magnetic field is produced by a permanent magnet. The use of a permanent magnet to generate a substantial air gap magnetic flux makes it possible to design highly efficient motors. For a common 3-phase permanent magnet synchronous motor, a standard 3-phase power stage is used. The power stage utilizes six power transistors with independent switching. The power transistors are switched in ways to allow the motor to generate power, to be free-wheeling or to act as a generator by controlling frequency.

Regenerative braking is the same as dynamic braking except the electrical energy generated is recaptured and stored in an energy storage system for future use.

Specific energy capacity as used herein is energy per unit mass (joules per kilogram).

A traction motor is a motor used primarily for propulsion such as commonly used in a locomotive. Examples are an AC or DC induction motor, a permanent magnet motor and a switched reluctance motor.

DETAILED DESCRIPTION

Figure 1:
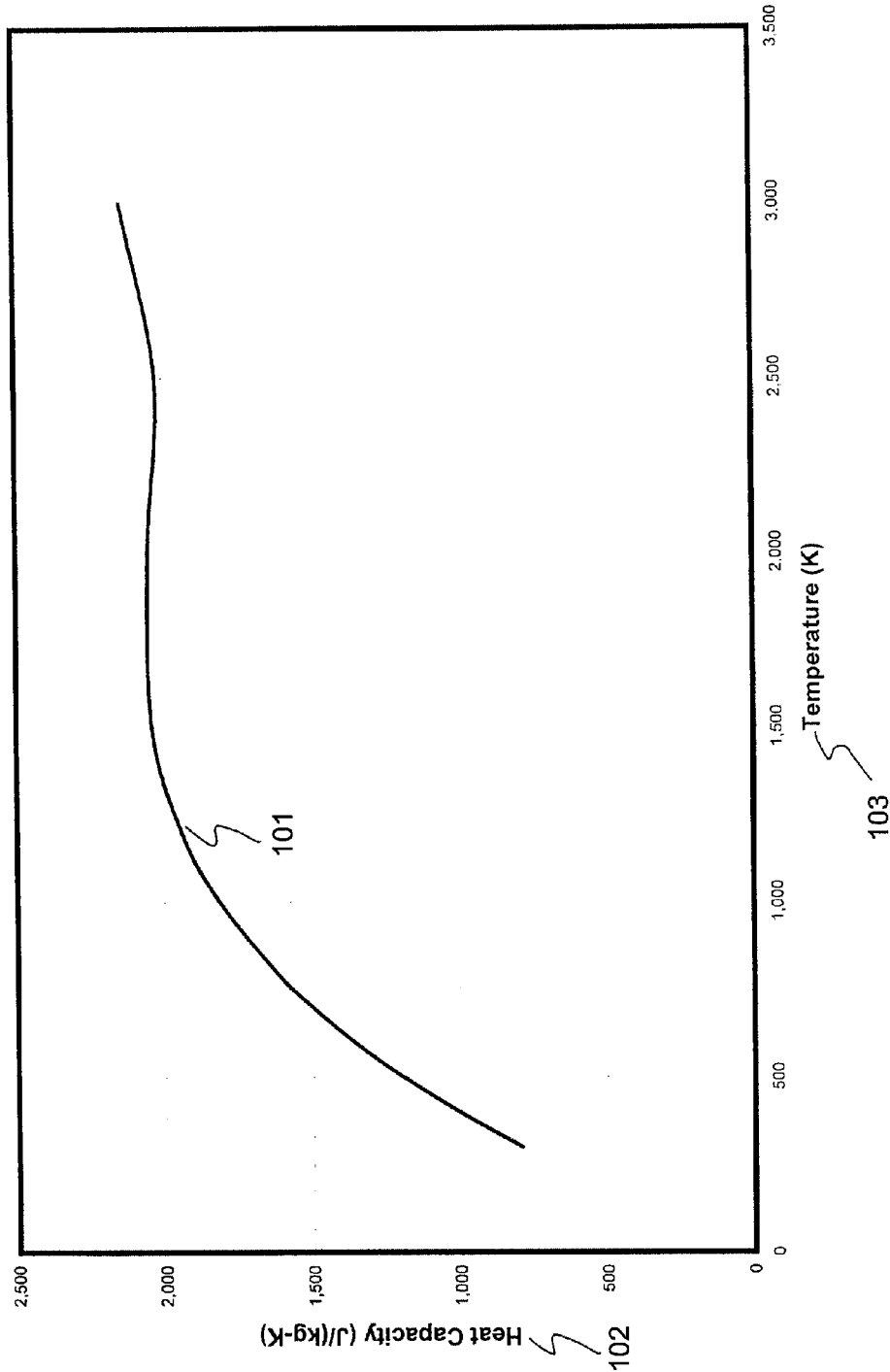
FIG. 1 is a plot of heat capacity of graphite versus temperature.

In the book "Submarine Technology for the 21st Century", various technologies are discussed for non-nuclear submarines capable of operating for long periods (several hours to days) while underwater. One of these technologies is the use of a graphite heat block as a heat source for a closed-cycle gas turbine power plant. In particular, the use of a graphite block heated to 2,500° C. in an induction furnace is described. An inert gas flows through the block, picks up heat, spins the turbine and returns to complete the loop.

The energy storage possible with this technology is substantially higher than other forms of energy storage and, in particular, is compatible with gas turbines as a source of auxiliary energy.

Capacitors, inductors, some batteries and flywheels can release their energy at very high rates but typically at the expense of energy storage capacity. Graphite at high temperatures has a specific energy capacity comparable to chemical explosives and is a very compact form of energy storage compared to capacitors, inductors, flywheels and batteries commonly used in regenerative braking energy storage systems.

In terms of specific energy capacity, the following table shows the typical specific energy capacities associated with several energy storage technologies.

| Energy Storage Technology | Specific Energy Capacity (MJ/kg) |
| --- | --- |
| Capacitors | 0.0004 to 0.001 |
| Inductors - Room Temperature | 0.001 |
| Inductors - Cryogenic | 0.003 |
| Homopolar Generator (flywheel) | 0.0085 |
| Energy Storage Batteries | 0.2 |
| Graphite Heat Block at 1,500 K | 2.0 |
| Graphite Heat Block at 2,000 K | 3.0 |
| Chemical Explosive (Octol) | 4.8 |

Some Thermal Properties of Carbon

The properties of carbon make it useful for the collection and storage of thermal energy. These properties include: (1) a high heat capacity, especially at elevated temperatures; (2) a high melting point; (3) a high thermal conductivity; and (4) relatively low heat loss by radiation. Although a number of other materials, such as boron nitride, boron carbide, silicon carbide, silicon dioxide, magnesium oxide, tungsten carbide and alumina can be used for a heat block, a preferred form of material is carbon and a preferred form of carbon is graphite. The graphite may be synthetic or impure graphite or high-quality natural graphite and it may contain some mineral impurities. The use of high purity natural graphite is preferred, for example graphite having a purity of from about 95% to about 99.9% by weight. Graphite having a purity of about 90% to about 99% by weight may be used. Graphite blocks may be blocks of solid graphite or compressed granular graphite. Graphite blocks may be fabricated from a single block, or they may comprise two or more smaller blocks which can be arranged in efficient thermal contact with adjacent blocks. Various forms of graphite and its fabrication are discussed in U.S. Pat. No. 5,994,681 entitled "Apparatus for Eddy Current Heating a Body of Graphite".

FIG. 1 is a plot of constant pressure specific heat capacity of graphite versus temperature. Specific heat capacity in joules per kilogram-degrees kelvin 102 is plotted against temperature in degrees kelvin 103 resulting in the specific heat capacity curve 101 which rises from about 0 at 0° K. and asymptotes after about 1,500° K. after to approximately 2,000 J/kg-K. This data was obtained from page 4-108 of the American Institute of Physics Handbook, $3^{rd}$ Edition.

Figure 2:
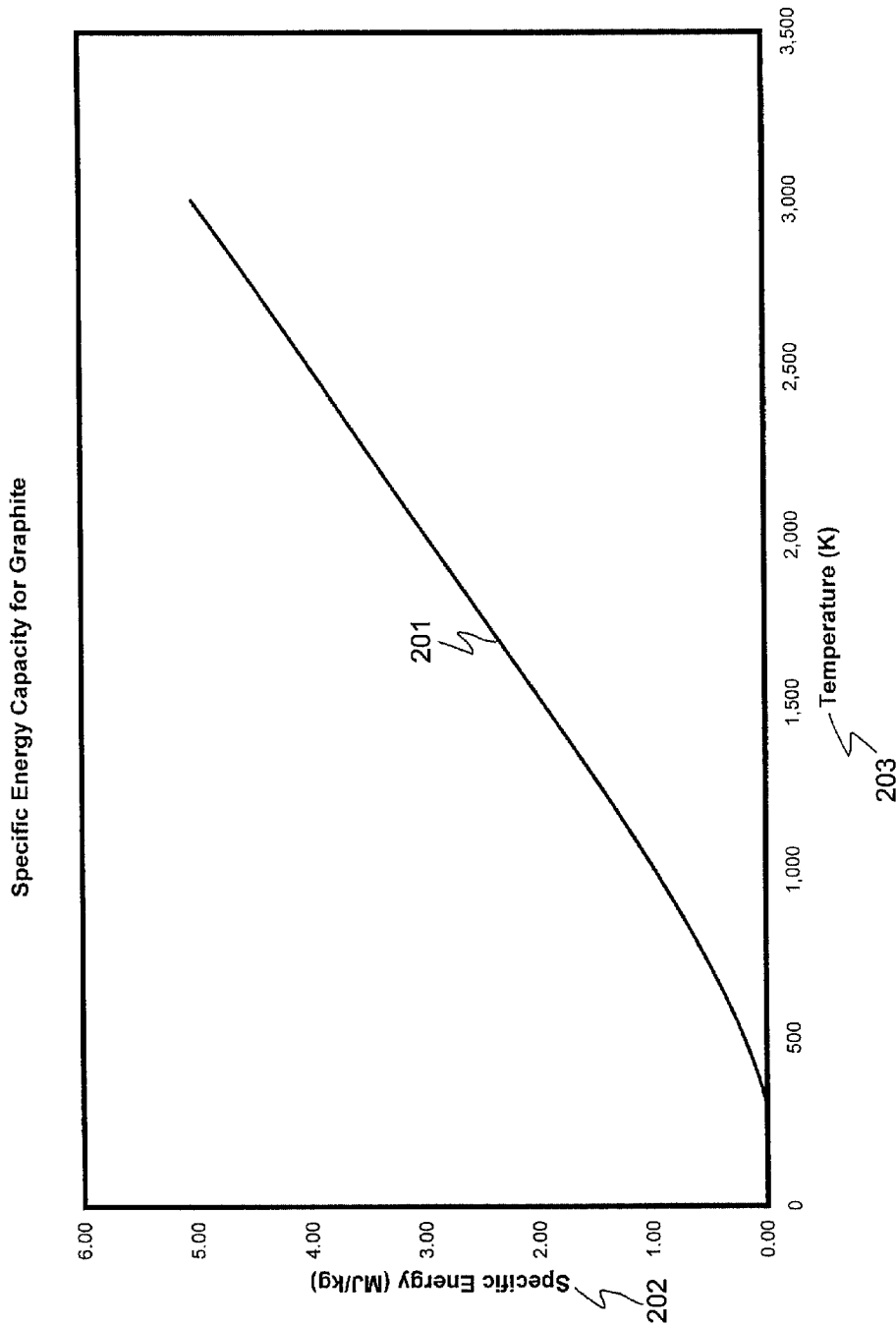
FIG. 2 is a plot of specific energy of a carbon block versus block temperature.

FIG. 2 is a plot of specific energy capacity of a typical high quality graphite block versus block temperature. Specific heat capacity in joules per kilogram 202 is plotted against temperature in degrees kelvin 203 resulting in the specific energy capacity curve 201. The specific energy capacity curve 201 is obtained by integrating the curve of specific heat from an initial temperature of 300° K. to 3,000° K. For example, a graphite block at 2,000 K will have a specific heat energy capacity of about 3 megajoules per kilogram (MJ/kg).

A Heat Block for Thermal Energy Storage

It is to be understood that a reference to carbon or graphite herein is intended to include other appropriate heat block materials such as for example other forms of carbon, boron nitride, silicon carbide, alumina, tungsten carbide or the like.

Figure 3:
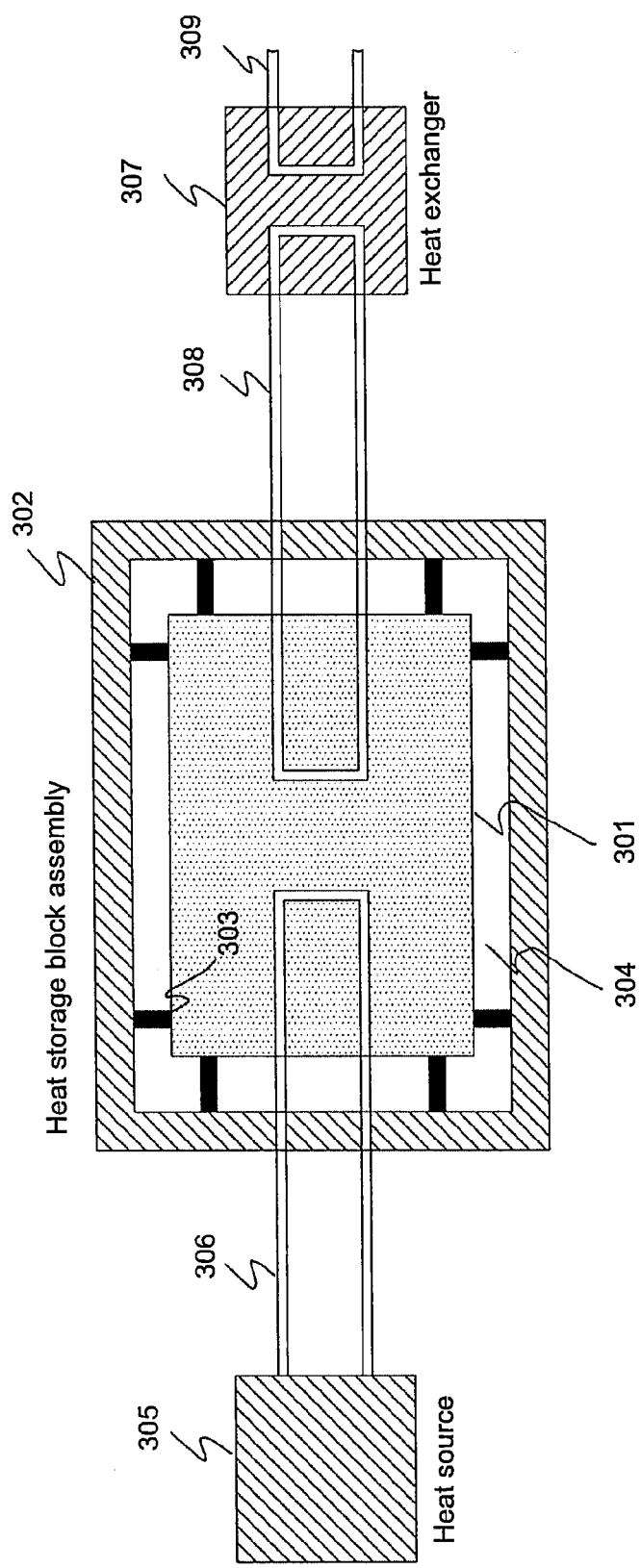
FIG. 3 is a schematic of an insulated carbon block energy storage system.

FIG. 3 is a schematic of an insulated carbon block thermal energy storage system. A carbon block 301 is mounted using thermally insulating standoff struts 303 inside an insulating container 302. The space between the carbon block 301 and the insulating container 302 is filled with an inert gas such as argon or helium or a suitable reducing gas, preferably at ambient pressure. Alternately, the space may be filled with an inert or reducing gas at very low pressures (for example as low as about 100 kilopascals).

A source of energy 305 is connected to the heat block 301 by a thermally conductive pathway 306. In the case of a thermal source of energy, the pathway might be a transfer fluid with a high heat capacity and thermal conductivity such as, for example, liquid sodium contained in a conduit made of a material that does not react with carbon, such as, for example, tungsten piping. The pathway could alternately be a thermally conductive solid with a high thermal conductivity and a high melting point such as for example tungsten rods. In the case of an electrical source of energy, the pathway might be a plurality of electrically conductive wires with high melting temperature such as, for example, tungsten wires arranged to form a resistive grid inside the heat block 301. The addition of heat energy to the heat block can be interrupted at any time by disconnecting the energy source either mechanically (for solid conduction or heat transfer fluids), electrically (for electrical conduction) or by slowing the rate of flow of heat transfer fluid from the source to the heat block.

The heat block 301 is connected to a heat exchanger 307 by a thermally conductive pathway 306. The pathway is preferably a heat transfer fluid with a high heat capacity and thermal conductivity. In one configuration, the heat transfer fluid is a liquid such as sodium contained in a conduit made of a material that does not react with carbon such as for example tungsten tubes. In another configuration, the heat transfer fluid is an inert gas such as for example argon or helium or a reducing gas contained in a conduits made of a material that does not react with carbon such as for example tungsten tubes. Helium is a preferred transfer fluid since it can transport a given amount of thermal energy at a lower temperature than an inert gas with a higher molecular weight such as argon. This is important when the heat exchanger 307 is comprised of materials that have a substantially lower melting temperatures than graphite. The pathway 309 is a working fluid that is used in a gas turbine or is used in another heat exchanger (not shown) to add heat to the working fluid in a gas-turbine. Interruption of the supply of heat energy from the heat block to the gas turbine can be accomplished at any time by disconnecting the heat block either mechanically (for heat transfer fluids) or by slowing the rate of flow of heat transfer fluid from the heat block to the heat exchanger.

As can be appreciated, the flow of transfer fluid or electrical current in pathway 306 can be regulated so that the temperature of the heat block is kept below a first desired maximum temperature. Also, the flow of transfer fluid in pathway 308 can be regulated so that the temperature of the heat exchanger 307 is kept below a second desired maximum temperature.

Figure 4:
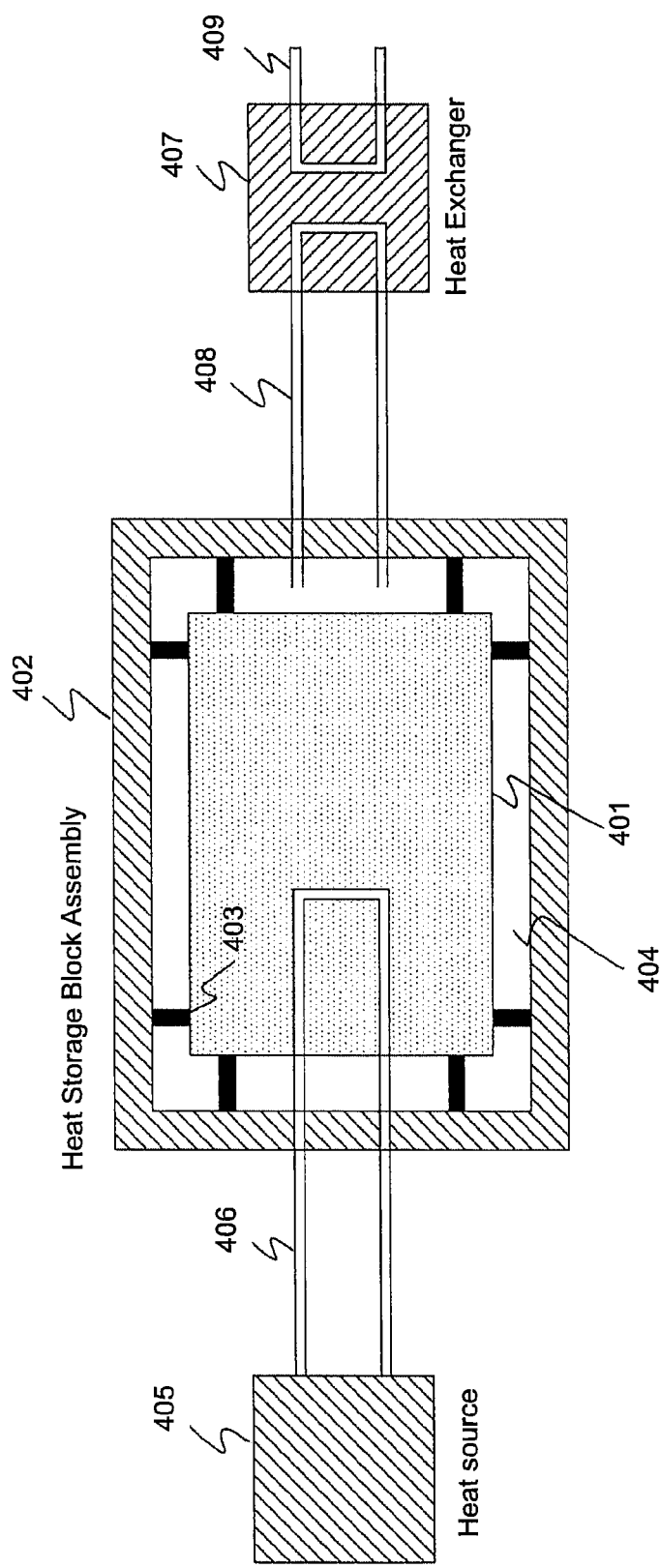
FIG. 4 is a schematic of an alternate insulated carbon block energy storage system.

FIG. 4 is a schematic of an alternate insulated carbon block energy storage system. A carbon block 401 is mounted using thermally insulating standoff struts 403 inside an insulating container 402. The space between the carbon block 401 and the insulating container 402 is filled with an inert heat transfer fluid such as argon or helium or a suitable reducing gas, preferably at ambient pressure. A source of energy 405 is connected to the heat block 401 by a thermally conductive pathway 406. The pathway 406 has the same description as the pathway 306 in FIG. 3. The addition of heat energy to the heat block can be interrupted at any time by disconnecting the energy source either mechanically (for solid conduction or heat transfer fluids), electrically (for electrical conduction) or by slowing the rate of flow of heat transfer fluid from the source to the heat block.

The heat block 401 is connected to a heat exchanger 407 by a thermally conductive pathway 406 which uses the same heat transfer fluid contained in the space between the carbon block 401 and the insulating container 402. The conduit or conduits 408 are made of a material that has a high melting point such as for example tungsten tubes. Helium is a preferred transfer fluid since it can transport a given amount of thermal energy at a lower temperature than an inert gas with a higher molecular weight such as argon. This is important when the heat exchanger 407 is comprised of materials that have a substantially lower melting temperatures than the heat block 401. The pathway 409 is a working fluid that is used in a gas turbine or is used in another heat exchanger (not shown) to add heat to the working fluid of a gas-turbine. Interruption of the supply of heat energy from the heat block to the gas turbine can be accomplished at any time by disconnecting the heat block either mechanically (for heat transfer fluids) or by slowing the rate of flow of heat transfer fluid from the heat block to the heat exchanger.

As can be appreciated, the flow of transfer fluid or electrical current in pathway 406 can be regulated so that the temperature of the carbon block is kept below a first desired maximum temperature. Also, the flow of transfer fluid in pathway 408 can be regulated so that the temperature of the heat exchanger 407 is kept below a second desired maximum temperature.

Figure 5:
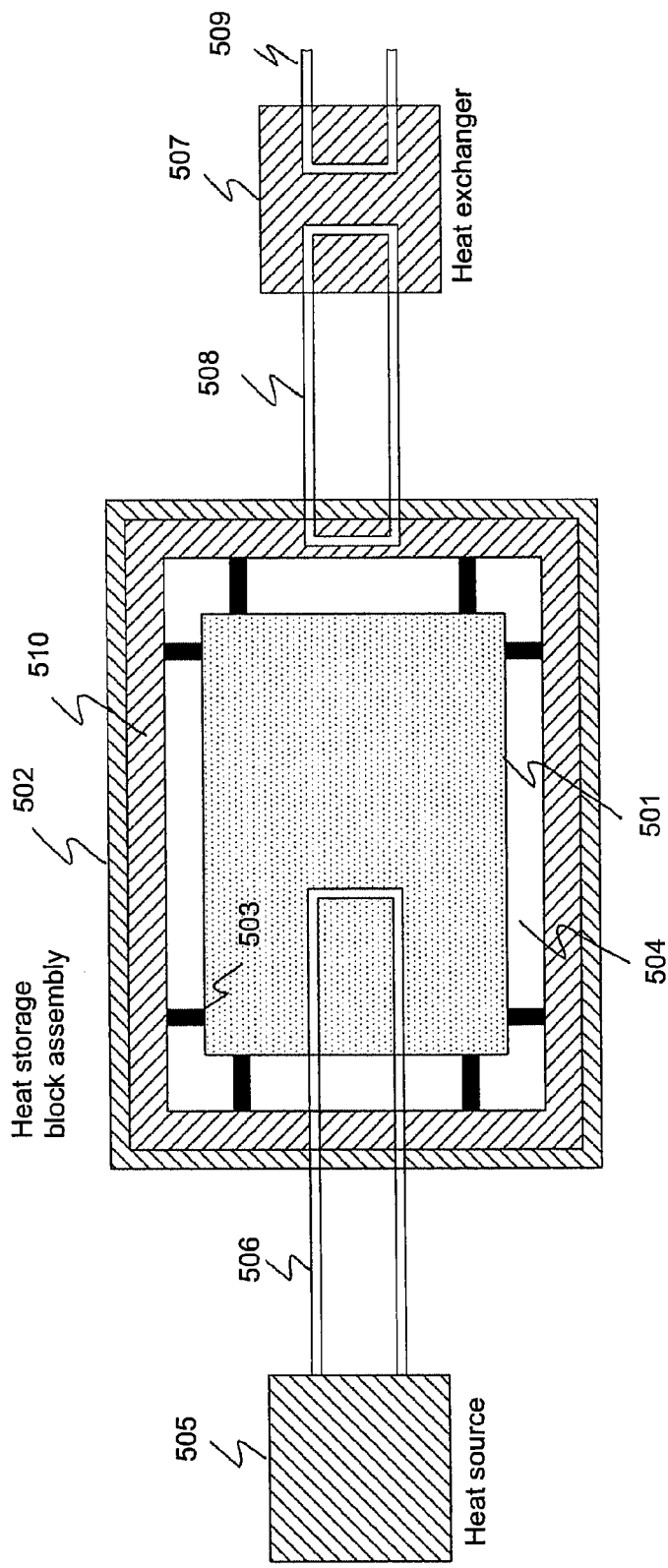
FIG. 5 is a schematic of an insulated carbon block energy storage system with intermediate storage.

FIG. 5 is a schematic of an insulated carbon block energy storage system with intermediate storage transfer capability. A carbon block 501 is mounted on thermally insulating standoff struts 503 inside an intermediate storage block 510 which, in turn, is contained inside an insulating container 502. The space between the carbon block 501 and the intermediate storage block 510 is filled with an inert gas such as argon or helium or a suitable reducing gas, preferably at ambient pressure. Alternately, the space may be filled with an inert or reducing gas at very low pressures (for example as low as about 100 kilopascals). As can be appreciated, the intermediate storage block 510 and the insulating container 502 can also be separated by thermally insulating standoff struts.

A source of energy 505 is connected to the heat block 501 by a thermally conductive pathway 506 as described in FIG. 3. The heat block 501 is connected to a heat exchanger 507 by a thermally conductive pathway 506 also as described in FIG. 3. The addition of heat energy to the heat block can be interrupted at any time by disconnecting the energy source either mechanically (for solid conduction or heat transfer fluids), electrically (for electrical conduction) or by slowing the rate of flow of heat transfer fluid from the source to the heat block.

The advantage of this configuration is that the temperature in the intermediate storage transfer block 510 can be lower than the temperature of the carbon block 501 by making the mass of the intermediate storage transfer block 510 higher than that of the carbon main heat storage block or by controlling the amount of energy transferred to the intermediate block. An intermediate storage transfer block is typically used to temporarily store heat energy at a lower temperature than the temperature of the primary heat storage block and has the function of transferring heat energy to a heat transfer fluid at a temperature compatible with its heat exchanger materials. An intermediate storage transfer block may be made of the same material as the main heat storage block or it may have a lower specific energy capacity and melting temperature than the main heat storage block. The lower temperature of the intermediate storage transfer block 510 may be more compatible with the heat exchanger materials of a gas turbine. The heat block 501 stores most of the thermal energy while the intermediate storage transfer block 510 acts more as a transfer means and need not have a large energy storage capacity. This configuration gives additional control over the temperature of the heat transfer fluid that moves heat from the storage system to the heat exchanger of the gas turbine.

Interruption of the supply of heat energy from the intermediate storage transfer block to the gas turbine can be accomplished at any time by disconnecting the transfer block either mechanically (for heat transfer fluids) or by slowing the rate of flow of heat transfer fluid from the transfer block to the heat exchanger.

As can be appreciated, the flow of transfer fluid or electrical current in pathway 406 can be regulated so that the temperature of the carbon heat storage block is kept below a first desired maximum temperature. By proper choice of geometry, size and materials, the temperature of the intermediate transfer block can be maintained at a second temperature that is substantially lower than that of the main heat block. Further, the flow of transfer fluid in pathway 408 can be regulated so that the temperature of the heat exchanger 407 is kept below a third desired maximum temperature.

The heat block storage systems described in FIGS. 3, 4 and 5 can be made in rectangular, square, cylindrical or spherical geometries. The heat block can be made of an appropriate material such as carbon, graphite, boron nitride, boron carbide, silicon carbide, silicon dioxide, magnesium oxide, tungsten carbide, alumina and the like. These are solid materials that have high specific heats and thermal energy densities as well has high melting temperatures.

The approximate properties of some materials suitable for the heat block of the present invention are shown in the table below.

|  | Graphite | Boron Nitride | Silicon Carbide |
| --- | --- | --- | --- |
| Maximum Working Temperature (C.) | 2,000 | 1,800 | 1,650 |
| Density (kg/m³) | 2,250 | 1,900 | 3,100 |
| Room Temperature Specific Heat (J/kg-K) | 712 | 1,610 | 750 |
| Room Temperature Thermal Conductivity (W/m-K) | 24 | 30 | 120 |

It is preferable to utilize solid thermal storage systems at ambient pressures to avoid the need for high temperature seals and to maintain the operational simplicity of the system.

Thermal insulation may be provided by any number of well-known thermally insulating materials. Alternately, the space between the heat block and its insulating container may be evacuated to minimize heat loss. The inner surfaces of the insulating container may be polished to minimize radiative heat loss. The insulating standoff struts may made from a ceramic such as for example alumina, silica, silicon nitride, silicon carbide, boron carbide, tungsten carbide and the like. As can be appreciated, direct contact between any of the carbon blocks and an oxidizing gas is to be avoided when the temperature of those gases is such as to result in substantial oxidation of the heat blocks. The temperature at which such oxidation occurs depends on the purity of the heat block material but may be as low as about 600 C for impure graphite carbon up to about 900 C for pure natural graphite. The heat transfer fluid, if in contact with the heat block, may in the form of a gas or liquid or combination thereof, preferably is substantially free of oxidants, especially oxygen and oxides, to avoid combustion of the heat block. This is particularly preferred when the heat block is formed from a combustible substance, such as carbon. In most applications, the heat transfer fluid includes no more than about 5 mole % oxidants, even more typically no more than about 1 mole % oxidants, and even more typically no more than about 0.1 mole % oxidants. The primary component of the fluid is an inert element or compound, such as a member of the Group 18 of the Periodic Table of the Elements with helium being preferred, and/or a reducing element or compound, such as an alkali metal, alkaline earth metal, a transition metal, and other metals that have a gaseous or liquid phase, with alkali metals being preferred. Typically, the fluid includes at least about 50 mole % of the primary component, even more typically at least about 75 mole %, and even more typically at least about 95 mole %.

Thermal Energy Storage for Regenerative Braking in Gas Turbine Vehicles

Figure 6:
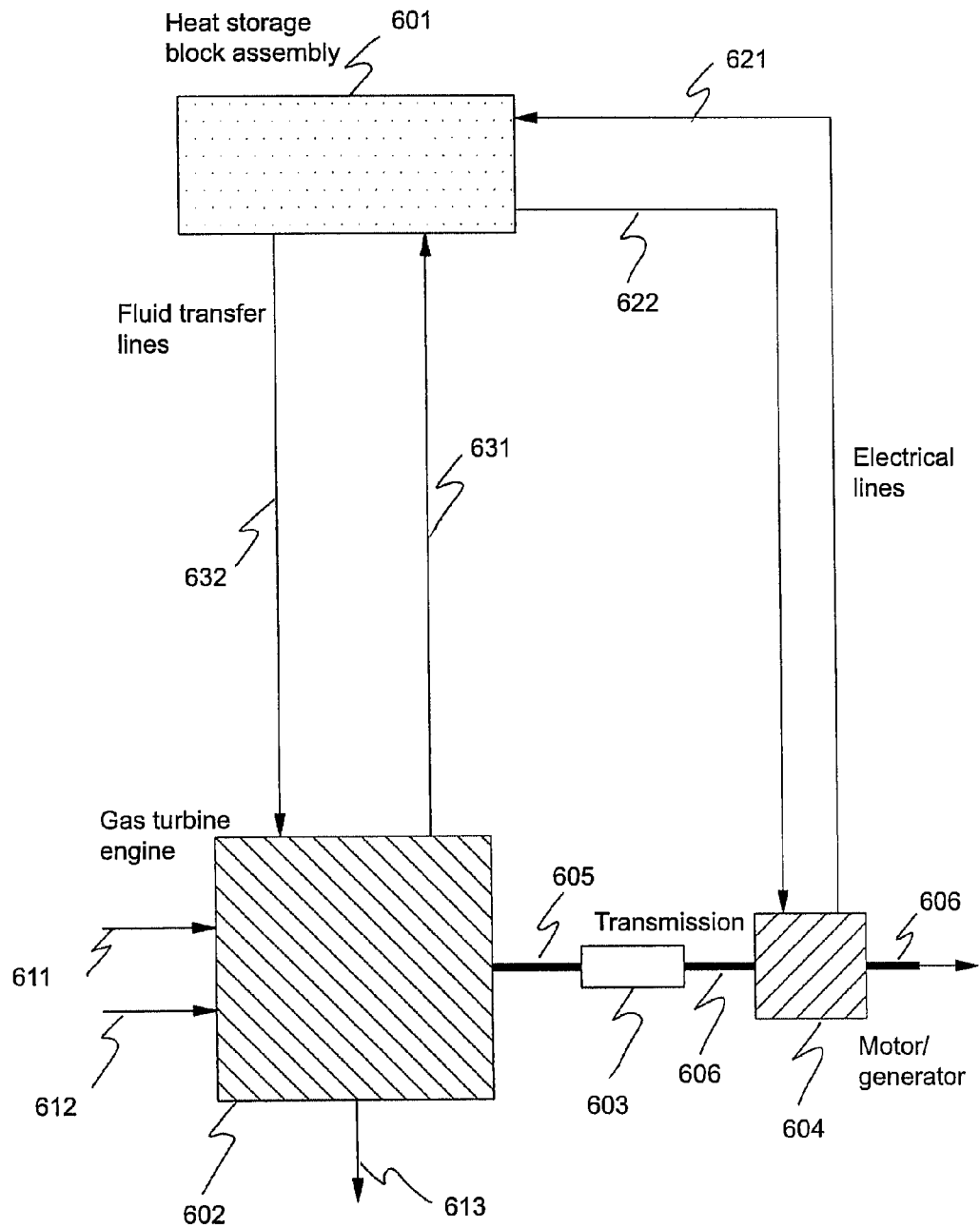
FIG. 6 is a schematic diagram of the principal elements of a regenerative braking system for a vehicle.

FIG. 6 is a schematic diagram of the principal elements of a regenerative braking system for a vehicle using a gas turbine engine. An open cycle gas turbine engine 602 is shown with air input 611 and fuel input 612. The fuel many be any of natural gas, diesel, gasoline, bio-diesel, ethanol, methanol, hydrogen or the like. The engine has an exhaust stream 613. The desired output of the engine is typically mechanical power of a rotating shaft 605 which is typically connected to a mechanical or hydraulic transmission 603. For regenerative braking, a possible configuration is a motor 604 connected to shaft 606 on the side of the transmission that is connected to the drive shaft and driving wheels. The motor may be an induction motor, a permanent magnet motor or the like. When the vehicle is under power, the motor 604 is disengaged from the drive shaft 606. When the vehicle is braking, the motor 604 is engaged with drive shaft 606 and acts as a retarder generator to provide braking action by producing an electrical output via a circuit comprised of electrical conductors 621 and 622. These conductors transmit electrical energy to a resistive grid embedded in the heat block 601 where the electrical energy is transformed into heat by resistive dissipation. The resulting thermal energy is stored in heat block 601. This is similar to the dynamic braking grid employed on diesel-electric locomotives except that the heat is stored in a heat block rather than being dissipated into the surrounding air.

In another configuration, a regenerative braking system may be comprised of small motors on some or all of the vehicle's axles. When the vehicle is under power, the motors are disengaged from the axles. When the vehicle is braking, the motors are engaged with the axles to act as a retarder generators to provide braking action by generating an electrical output which is directed via electrical conductors to a resistive grid embedded in the heat block where, as before, the electrical energy is transformed into heat by resistive dissipation. The resulting thermal energy is stored in heat block.

In yet another configuration, a second motor (not shown) is positioned on output shaft 605 between the engine and the transmission. When the vehicle is stationary and idling, this motor can be engaged to generate electrical energy from the idling engine. This electrical output is directed via electrical conductors to a resistive grid embedded in the heat block where, as before, and the electrical energy is transformed into heat in the heat block by resistive dissipation.

As an alternate regenerative braking system, the output shaft 605, transmission 603, drive shaft 606 and motor 604 may be replaced by a mechanical-to-electrical energy conversion device, such as an electrical generator or alternator, and one or more traction motors such as used on diesel-electric locomotives. In this system, the mechanical-to-electrical energy conversion device supplies electrical energy to an AC or DC electrical bus which in turn provides electrical energy to the traction motors for propulsion or absorbs electrical energy from the traction motors during braking The traction motor or motors provide propulsive power to the wheels or, when braking, can be switched to act as generators to provide braking action thereby suppling electrical energy to a heat block via a resistive grid embedded in the heat block. As in a diesel-electric locomotive, the AC or DC electrical bus can be configured to provide electrical energy to a heat block when the vehicle is stationary and idling via the resistive grid embedded in the heat block. When idling, the electrical power supplied to the AC or DC bus can be switched to the resistive grid.

The heat from the heat block 601 can be used to provide all or a portion of the heat energy to the working fluid of the gas turbine via a heat exchanger (not shown) inside engine 602. When required, the heat stored in the heat block 601 is transferred to the gas turbine engine 602 via transfer fluid conduits 631 and 632 which transports heat to a heat exchanger in the engine 602 via conduit 632 and return the fluid to the heat block 601 via conduit 632. This process is described in FIG. 6 for the example of an intercooled, recuperated gas turbine engine. As can be appreciated, other configurations of gas turbine engines can be used. These can include configurations that may or may not have intercooling, recuperation, reheating; may or may not utilize a free power turbine; and may have fewer or more stages of compression.

Figure 7:
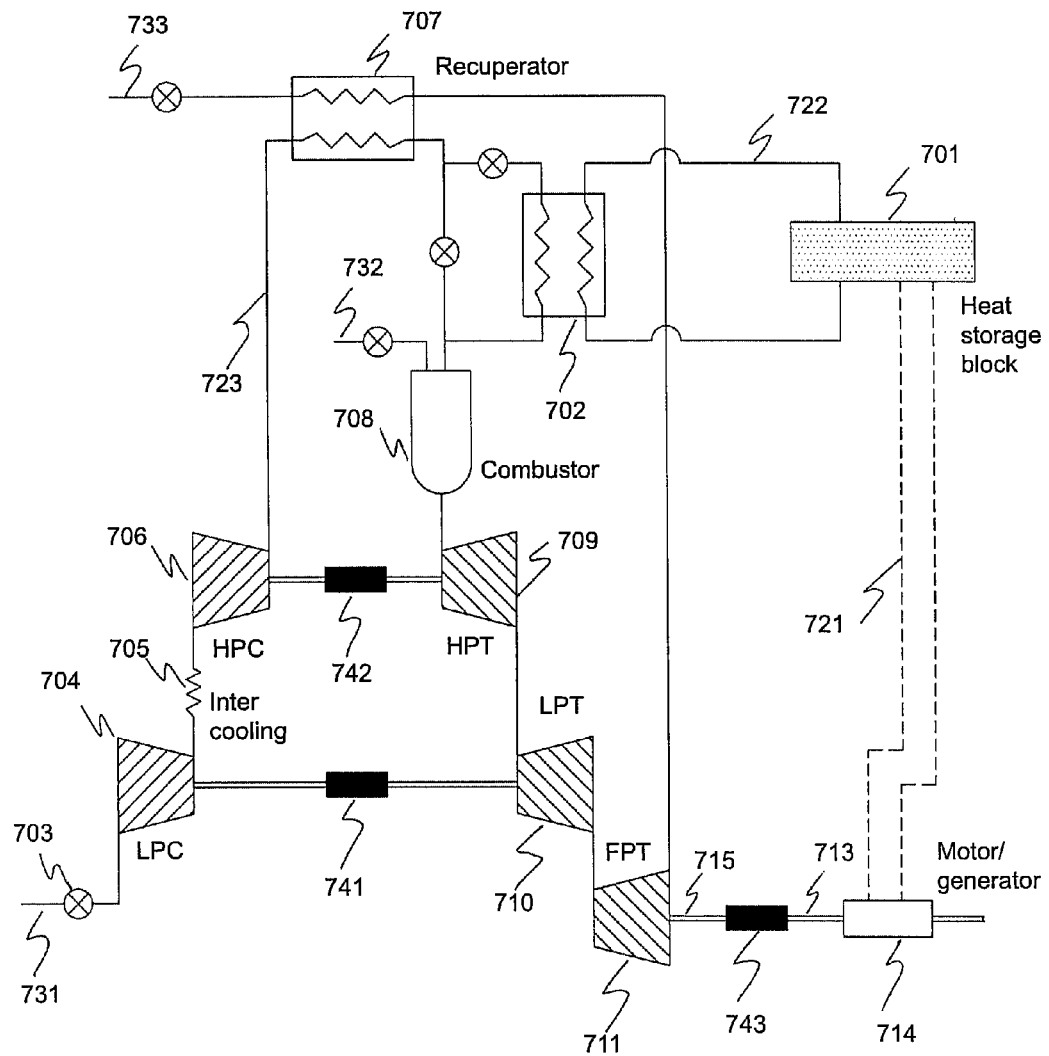
FIG. 7 is a schematic diagram of a moderate temperature carbon block energy storage system for a gas turbine.

FIG. 7 is a schematic diagram of a regenerative braking system for a vehicle with a gas turbine engine which uses a carbon block energy storage system operated at moderate temperatures (preferably in the range of about 1,500° C. to about 2,000° C.). This figure shows an intercooled, recuperated gas turbine engine which is comprised of a low pressure compressor (LPC) 704, an intercooler apparatus (IC) 705, a high pressure compressor (HPC) 706 a recuperator 707, a combustor 708, a high pressure turbine (HPT) 709, a low pressure turbine (LPT) 710, a free power turbine (FPT) 711 with output shaft 715 and a transmission 743 connected to a drive shaft 713. A regenerative braking system is also shown and it is comprised of a braking motor 714, a heat energy storage block 701 and a heat exchanger 702. Without a contribution from the stored heat energy in block 707, inlet air 731 (which may be controlled by a valve such as 703) is compressed by LPC 705, then cooled at approximately constant pressure in IC 705, compressed by HPC 706 to approximately maximum working pressure. The inlet air is heated by passing through recuperator 707 and then heated to full working temperature by fuel energy added in combustor 708. The hot, high pressure working fluid then expands in HPT 709 powering HPC 706 via coupling 742, further expands in LPT 710 powering LPC 704 via coupling 741 and finally expanding in FPT 711 powering output shaft 715. The exhaust gases are then passed through the hot side of recuperator 707 giving up heat energy to the inlet air passing through the cool side of recuperator 707 before being vented 733 to the atmosphere possibly by a valve similar to inlet valve 703.

When the vehicle brakes, transmission 743 is disengaged and motor 714 is engaged to generate electrical energy via conductors 721 where it is dissipated in a resistive grid (not shown) embedded in heat block 701. A heat transfer fluid is circulated between heat block 701 and heat exchanger 702 via fluid conduit 722 which passes through the hot side of heat exchanger 702. A portion or all of the compressed inlet air heated by recuperator 707 can now be passed through heat exchanger 702 to gain further energy and temperature at approximately constant pressure before being injected into combustor 708. If the injected air is at the desired temperature for the combustor exit, no fuel need be added. If the injected air is at a lower temperature than the desired temperature for the combustor exit, an appropriate amount of fuel 732 is added via a valve similar to inlet valve 703. As can be appreciated, when heat is added to the inlet air via heat exchanger

702, less fuel is required by the combustor 708 than without regenerative braking capability.

Depending on the duty cycle of the vehicle, the regenerative braking system described herein can have a modest or a large effect on the overall efficiency of the gas turbine. For example, a delivery van or bus normally has a duty cycle with a lot of stops and starts and so a regenerative braking system could substantially increase overall fuel efficiency. On the other hand, a long haul Class 8 semi-trailer truck may have a duty cycle with few stops and starts and so a regenerative braking system would provide some increase overall fuel efficiency by capturing energy from downhill travel or the occasional stop and go traffic conditions.

As an example of how such a regenerative braking system can be installed on a Class 8 semi-trailer truck, a 330 kg heat block can be mounted, for example, under or on top of the trailer. Flexible insulated heat transfer fluid lines can be connected from the heat block to the cab. These lines would continue into the cab's engine compartment to a small heat exchanger mounted on the gas turbine engine. Such a heat block, operated between about 1,730 C and 1,230 C, can deliver a useable thermal energy equivalent of about 24 gallons of diesel fuel.

Figure 8:
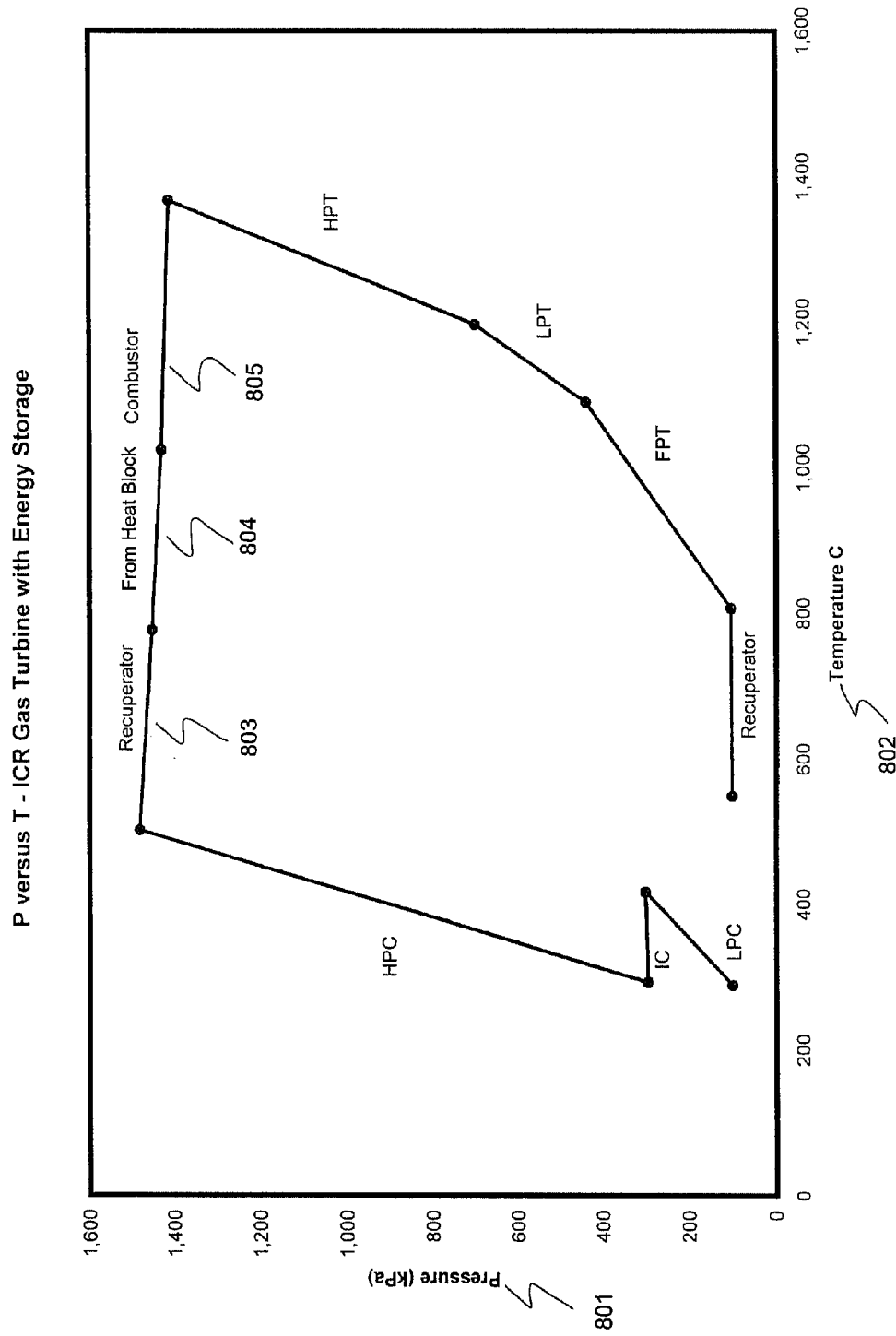
FIG. 8 is a plot of pressure versus temperature for a gas turbine process with energy storage.

FIG. 8 is a plot of working fluid pressure versus temperature for a gas turbine process with energy storage. This figure shows working fluid pressure 801 versus working fluid temperature 802 as it moves between the components of the engine. Assuming a working gas flow rate of about 1 kg/s in the gas turbine engine of this example, the temperature entering the cold side of the recuperator is about 230 C and the enthalpy is about 0.5 MJ. The temperature exiting the cold side of the recuperator is about 500° C. and the enthalpy is increased to about 0.78 MJ. In this example, heat from the heat block is transported by helium at a pressure compatible with the cold side of the heat exchanger and at a temperature of about 800° C. into the hot side of the heat exchanger and exits at about 700° C. from the hot side of the heat exchanger. The temperature of the working fluid entering the cold side of the heat exchanger is about 500° C. and the enthalpy is about 0.78 MJ. The temperature exiting the cold side of the heat exchanger is about 750° C. and the enthalpy is increased to about 1.03 MJ. The temperature entering the combustor is about 750° C. and the enthalpy is about 1 MJ. The temperature exiting the combustor is the desired 1,090° C. and the enthalpy is increased to its highest value of about 1.37 MJ. In this example, the recuperator has added about 0.28 MJ, the heat exchanger has added about 0.25 MJ and the fuel in the combustor has added about 0.34 MJ per kg of working fluid.

Without the energy added by the regenerative braking system, the fuel energy required is about 0.59 MJ per second. When energy is added from the heat block, the fuel energy required is about 0.34 MJ per second or about a 42% reduction in fuel consumption.

The engine in this example is about a 300 kW gas turbine. In this example, air is input at 1 kg/s and helium is pumped at about 0.16 kg/s to provide the required heat energy from the energy storage heat block. The maximum temperature developed on the hot side of the heat exchanger is about 800° C. which is within the capability of common heat exchanger materials.

As can be appreciated, the maximum temperature developed on the hot side of the heat exchanger can be reduced if the helium flow rate to the heat exchanger is increased or the maximum temperature developed on the hot side of the heat exchanger can be increased if the helium flow rate to the heat exchanger is reduced.

Figure 9A:
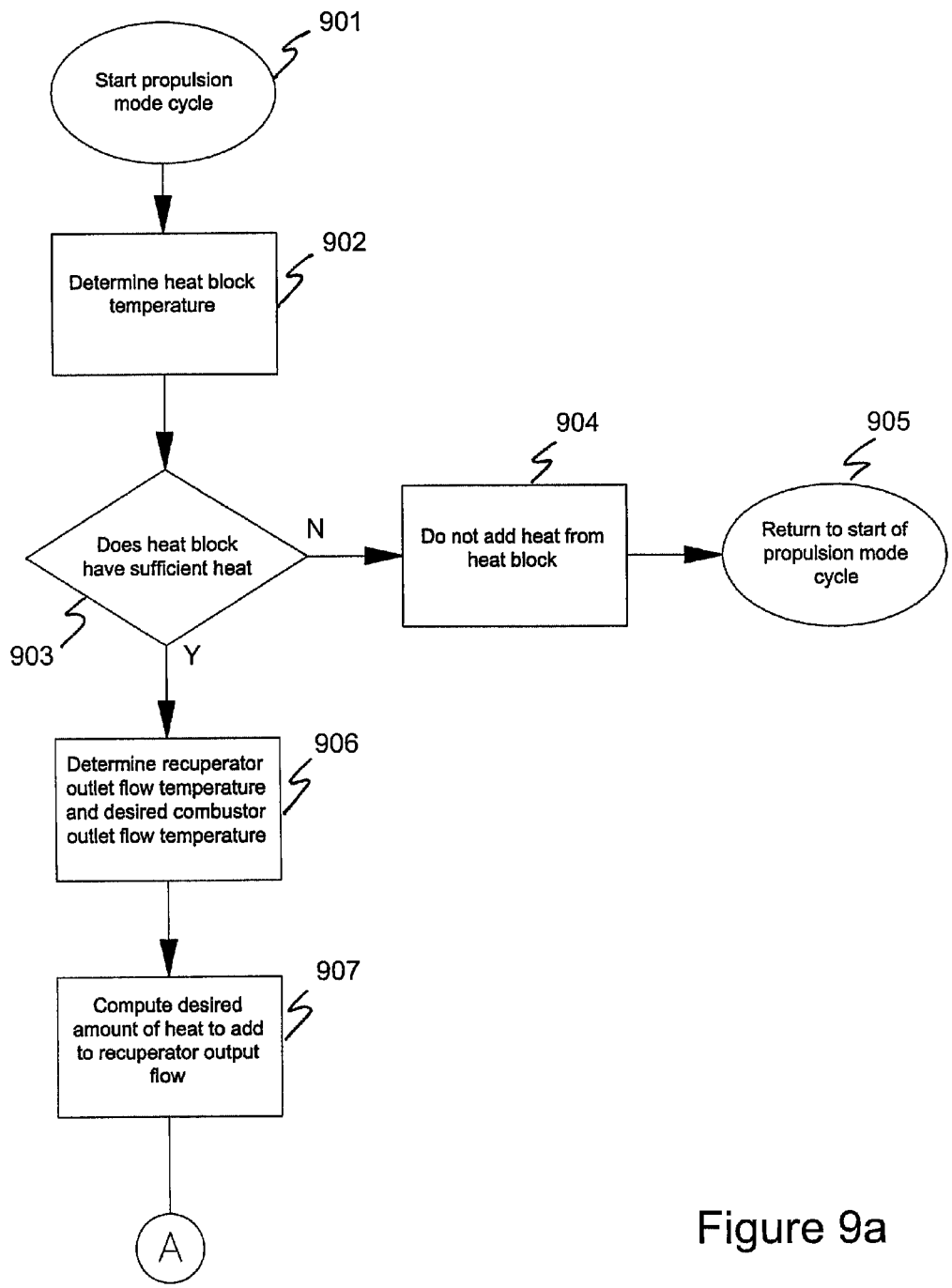
FIG. 9a and FIG. 9b is a flow chart of a heat storage regenerative braking system during vehicle propulsion.
Figure 9B:
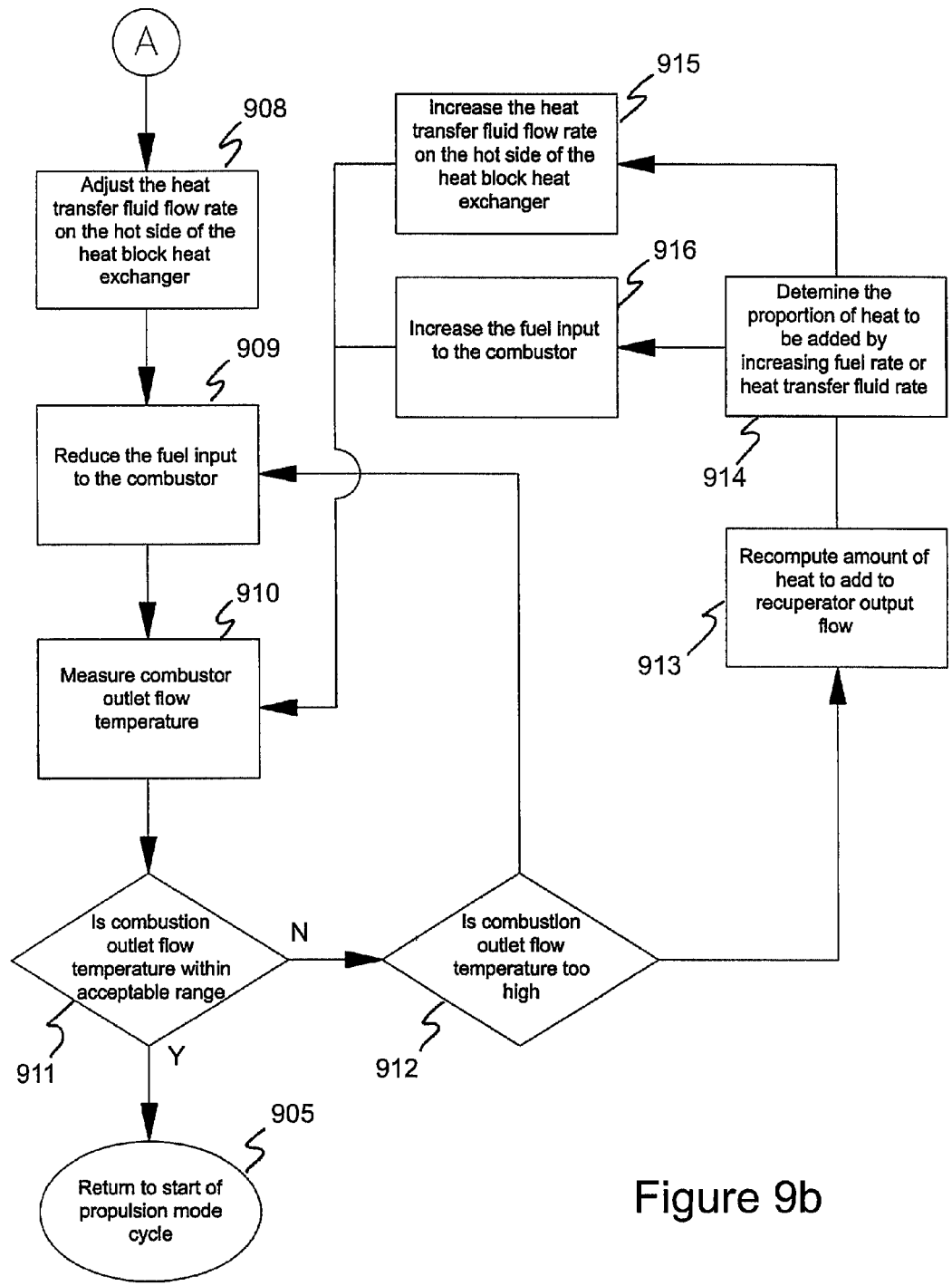

FIGS. 9a and 9b is an example of a flow chart for simple, automated decision making for controlling power flow from a heat storage system to a gas turbine engine during vehicle propulsion. This cycle of decisions can be executed continuously (for example every millisecond) or intermittently (for example every 1 second) or at intervals in between by a predetermined computer program or by a computer program that adapts, such as for example, a program based on neural network principles. As can be appreciated, many of the steps can be carried out in different sequences and some of the steps may be optional.

In FIG. 9a, the automated cycle begins 901 and in the first step 902, the average temperature of the heat block is determined by any number of well-known means. This temperature is also used to determine the amount of heat energy in the heat block. In step 903, if there is insufficient heat energy in the heat block, then the decision 904 is made to not use energy from the heat block to reduce fuel consumption in the gas turbine engine and the program is returned 905 to the start of the cycle 901. In step 903, if there is sufficient heat energy in the heat block, then the recuperator outlet flow temperature and the desired combustor outlet flow temperatures are determined in step 906. The recuperator outlet flow temperature is determined by any number of well-known means. The desired combustor outlet flow temperature is determined by the power output requirement of the gas turbine engine which will depend on whether the engine is set to idle, 30% maximum power, 80% maximum power of full power by the vehicle operator. Once recuperator outlet flow temperature and the desired combustor outlet flow temperature are determined, the amount of heat that is desired to be added to the recuperator outlet flow can be determined in step 907. This can be an amount to bring the flow temperature up to the desired combustor outlet flow temperature in which case no fuel is required. Alternately, it can be an amount to bring the flow temperature up to a temperature between the recuperator outlet flow temperature and the desired combustor outlet flow temperature in which case some fuel is required for the combustor.

The flow chart of FIG. 9a continues in FIG. 9b as indicated. In step 908, the heat transfer fluid flow rate on the hot side of the heat exchanger (item 707 in FIG. 7) is adjusted to provide the amount of heat determined in step 907. Then the fuel flow rate into the combustor is reduced in step 909 to provide enough additional heat to the flow to achieve the desired combustor outlet flow temperature which is measured as in step 910. If the combustor outlet flow temperature is within an acceptable range (for example within 25 degrees Kelvin of the desired temperature), then the program is returned 905 to the start of the cycle 901 (see FIG. 9a). If the combustor outlet flow temperature is outside an acceptable range, then in step 912, the combustor outlet flow temperature is determined to be either too high or too low. If the temperature is too high, then the program returns to step 909 where the fuel flow rate into the combustor is reduced by an amount required to reduce the combustor outlet flow temperature to within the acceptable range. If the temperature is too low, then the program moves to step 913 to determine the additional amount heat to be added to the outlet flow from the recuperator either by the heat exchanger or by increasing fuel flow rate or by a combination of both. In step 914, the proportion of heat to be added to the outlet flow from the recuperator by increasing fuel flow rate or heat transfer fluid flow rate is determined. The selected proportion will depend on an algorithm that accounts for several factors including for example how much heat is available from the heat block, how fast the heat transfer from the heat block can be added and the like. In step 915, the increase in heat transfer fluid flow rate is determined to provide the portion of heat from the heat block and in step 916, the increase in fuel flow rate is determined to provide the portion of heat from the fuel supply. The program then moves back to step 910.

Figure 10A:
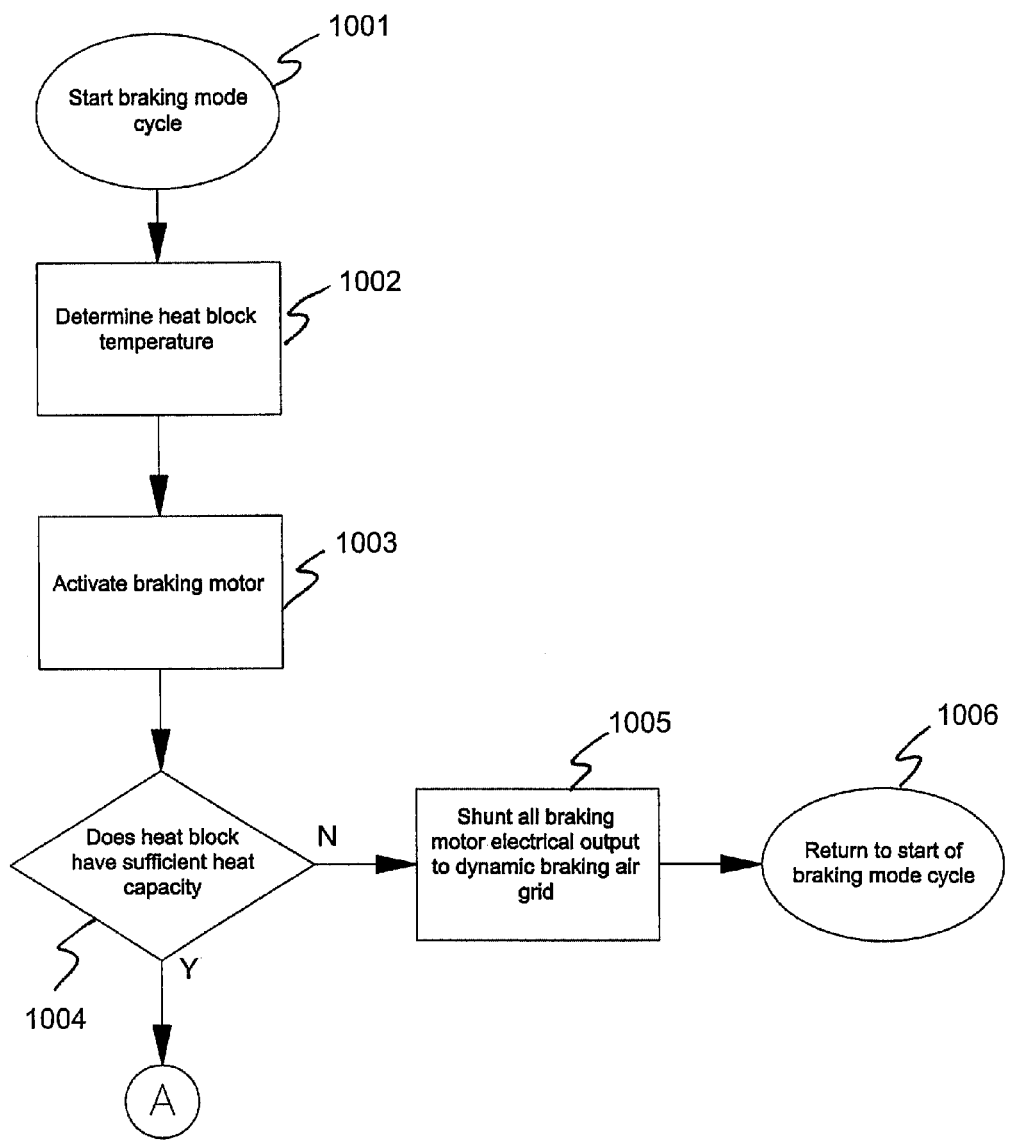
FIG. 10a and FIG. 10b is a flow chart of a heat storage regenerative braking system during vehicle braking
Figure 10B:
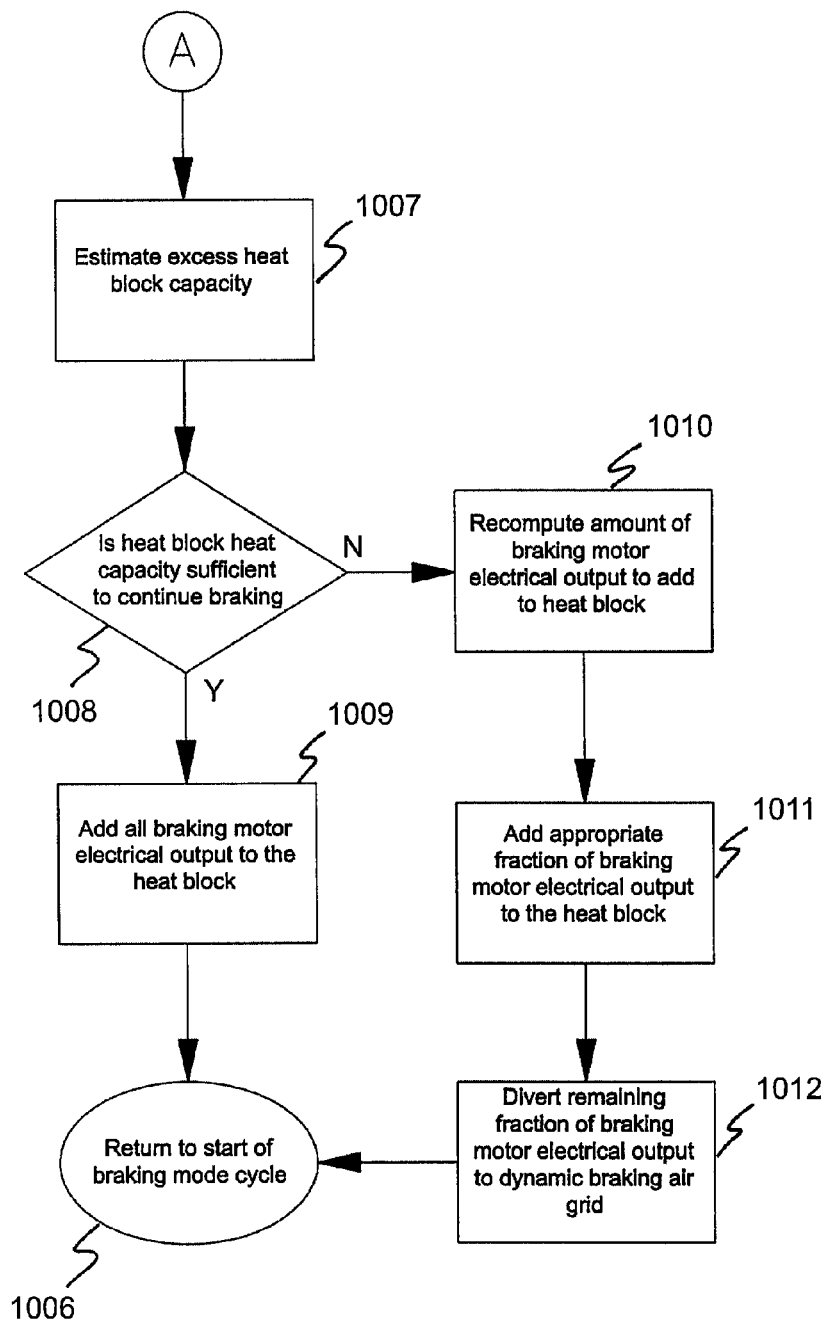

FIG. 10*a* and FIG. 10*b* is an example of a flow chart for simple, automated decision making for controlling power flow to a heat storage system from a gas turbine engine during vehicle braking In FIG. 10*a*, the automated cycle begins 1001 and in the first step 1002, the average temperature of the heat block is determined by any number of well-known means. This temperature is also used to determine the amount of heat energy in the heat block. The next step 1003 is to activate the braking motor (item 714 in FIG. 7). In step 1004, the capacity of the heat block to accept additional heat is estimated. If there is not sufficient capacity remaining in the heat block, then all the electrical energy from the braking motor may be shunted as indicated in step 1005 to a resistive air grid that is exposed to air flow such as is known for dynamic braking in diesel-electric locomotives. The program is then returned 1006 to the start of the cycle 1001. Alternately, step 1005 can cause the vehicle to activate a standard mechanical braking system or a combination of a mechanical braking system and a resistive air grid such as used in step 1005.

The flow chart of FIG. 10*a* continues in FIG. 10*b* as indicated. If there is sufficient capacity remaining in the heat block, then an estimate is made of the excess capacity in step 1007 and a determination is made in step 1008 on whether all or a portion of the electrical energy from the braking motor may be added to the heat block. If there is sufficient capacity in the heat block, all of the electrical energy from the braking motor can be added to the heat block and then the program is then returned 1006 to the start of the cycle 1001 (see FIG. 10*a*). If there is insufficient capacity in the heat block, a portion of the electrical energy from the braking motor can be added to the heat block as in step 1011 and the remaining portion can be diverted as in step 1012 to a resistive air grid such as used in step 1005. The program is then returned 1006 to the start of the cycle 1001 (see FIG. 10*a*).

Alternate Heat Exchanger Configurations

Figure 11:
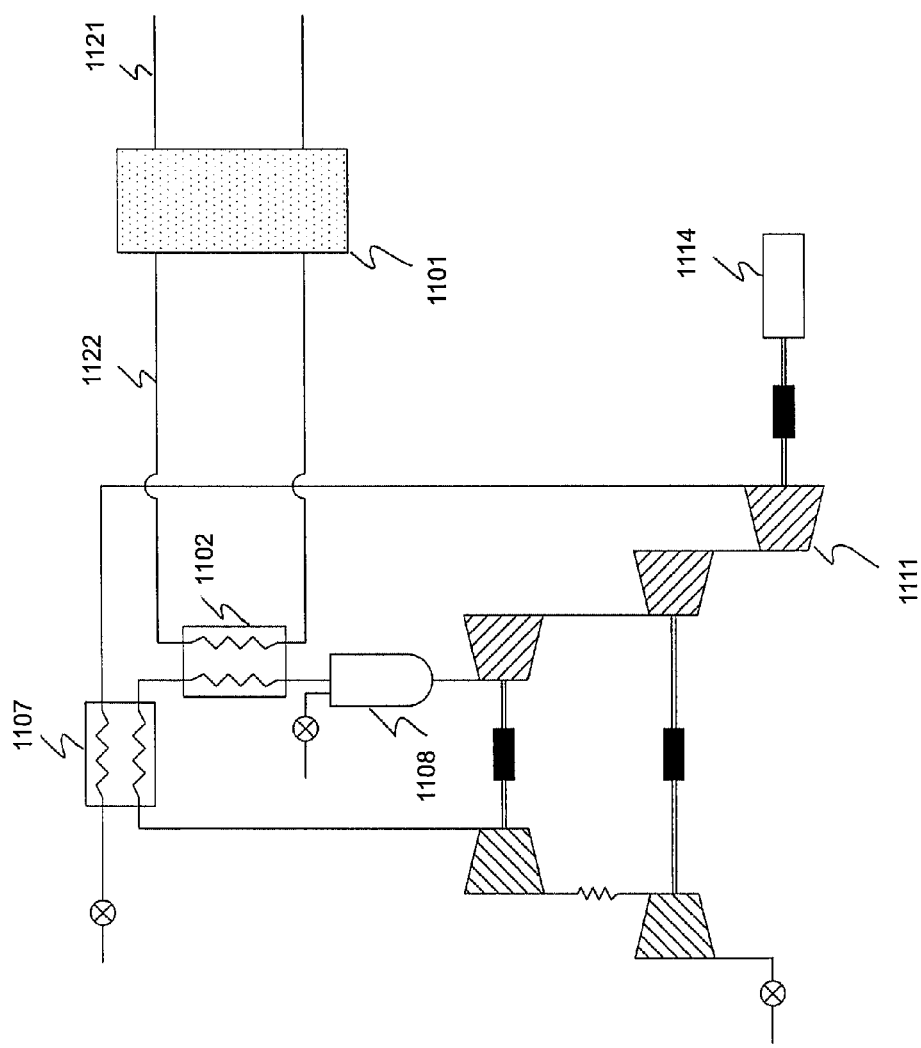
FIG. 11 shows another heat exchanger configuration for an energy storage block and a gas turbine.

FIG. 11 shows another heat exchanger configuration for an energy storage block and a gas turbine. As shown in FIG. 7, the heat block 601 transfers heat to the working fluid of a gas turbine via a heat exchanger 602 which can add heat in parallel to a stream of working fluid from the recuperator or in series with the stream of working fluid from the recuperator, depending on the desired inlet temperature of the combustor 608. In FIG. 11, the heat block 1101 transfers heat to the working fluid of a gas turbine via a heat exchanger 1102 which is in series with the stream of working fluid from the recuperator. The configuration of FIG. 11 has fewer components than the configuration of FIG. 7. The configuration of FIG. 11 may be more suitable, for example, for a vehicle with a duty cycle comprised of primarily stops and starts such as a delivery vehicle or bus where the heat block always has a ready supply of heat energy.

Figure 12:
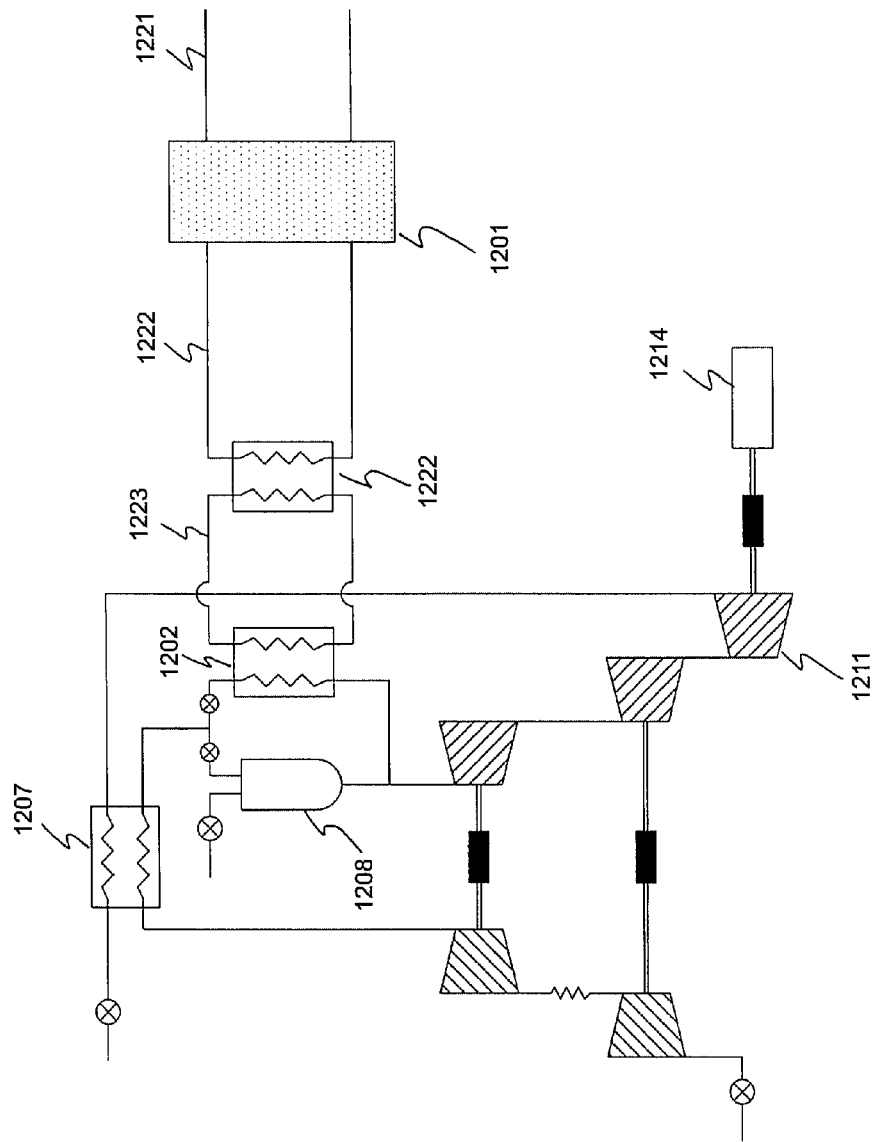
FIG. 12 shows yet another heat exchanger configuration for an energy storage block and a gas turbine.

FIG. 12 shows yet another heat exchanger configuration for an energy storage block and a gas turbine system. In this configuration, a second heat exchanger 1222 is used first to transfer heat from the heat block using a first heat transfer fluid via path 1222 to a second heat transfer fluid via path 1223 to heat exchanger 1202 which is typically an integral part of the gas turbine engine. This configuration allows the heat block to be maintained at a higher temperature and hence increased heat storage capacity. The maximum temperature achieved in heat transfer fluid used in path 1223 is typically limited by the materials used in heat exchanger 1202 which is preferably inside the engine. The maximum temperature achieved in heat transfer fluid used in path 1222 can be higher since the materials used in heat exchanger 1222 may require a much larger heat exchanger which can be mounted outside the engine near the heat block.

A number of variations and modifications of the invention can be used. As will be appreciated, it would be possible to provide for some features of the invention without providing others. For example, the heat block storage system can be used with a small vehicle such as a car wherein the engine may be a closed cycle gas turbine engine. In this configuration, thermal energy may be input into the resistive grid of a heat block via a plug-in electrical connection to a power grid while the vehicle is parked and augmented by a regenerative braking system when the vehicle is underway.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle system, comprising:
   at least one gas turbine engine;
   at least one of a plug-in to a power grid, an electrical generator, and a braking system, the plug-in to a power grid generating electrical energy when the at least one gas turbine engine is not operating, the electrical generator generating electrical energy when the at least one gas turbine engine is idling, and the braking system generating electrical energy when braking;

a resistive grid to transform the electrical energy from the at least one of a plug-in, electrical generator, and braking system into thermal energy by resistive dissipation;

at least one heat block in thermal communication with the resistive grid to absorb the thermal energy, wherein the at least one heat block is in thermal communication with the at least one gas turbine engine; and wherein the electrical energy from the at least one of a plug-in, electrical generator, and braking system is generated by a motor connected to a first shaft that is in mechanical communication with a transmission which is in mechanical communication with the at least one gas turbine engine, and wherein, in a first mode, the motor is disengaged from the first shaft and produces substantially no electrical energy and, in a second mode, the transmission is disengaged and the motor is engaged with a second shaft and generates the electrical energy from the at least one of a plug-in, electrical generator, and braking system in response to braking.

2. The system of claim 1, further comprising:

a first motor connected to a first shaft in mechanical communication with a transmission which is in mechanical communication with the at least one gas turbine engine;

a second motor connected to a third shaft positioned between the gas turbine engine and the transmission, the second motor being in mechanical communication with the at least one gas turbine engine and the transmission; and wherein, in the first mode, the first motor and the second motor are disengaged from the first shaft and the third shaft and produce substantially no electrical energy and, in a third mode, the second motor is engaged with the third shaft and generates the electrical energy when the vehicle system is stopped and idling.

3. The system of claim 1, wherein the motor comprises an axle motor associated with a vehicle axle, and wherein, in the first mode, the axle motor is disengaged from the vehicle axle and produces substantially no electrical energy and, in the second mode, the axle motor is engaged with the vehicle axle and generates the electrical energy in response to braking.

4. The system of claim 1, wherein a heat exchanger is in thermal communication with the heat block and transfers thermal energy from the heat block to a working fluid and wherein a heated working fluid provides power to the gas turbine engine.

5. The system of claim 1, wherein the gas turbine engine comprises:

a first low pressure compressor to compress an input fluid to form a first input fluid at a first pressure;

an intercooler apparatus to cool the first input fluid to a lower first temperature;

a first high pressure compressor to compress the cooled first input fluid to form a second input fluid at a second pressure higher than the first pressure;

a recuperator to heat the second input fluid to a higher second temperature;

a heat exchanger in thermal communication with the heat block wherein the second input fluid passes through a cold side of the heat exchanger;

a combustor to heat the second input fluid to form a third input fluid having a third temperature higher than the first and second temperatures;

a second high pressure turbine to power the first high pressure compressor in response to expansion of the third input fluid;

a second low pressure turbine to power the first low pressure compressor in response to further expansion of the third input fluid; and a free power turbine to power an output shaft in response to further expansion of the third input fluid, wherein a working fluid is the second input fluid.

6. The system of claim 5, wherein fuel is supplied to the combustor when the second input fluid is at a temperature less than the third temperature.

7. A vehicle system, comprising:

at least one gas turbine engine;

at least one of a plug-in to a power grid, an electrical generator, and a braking system, the plug-in to a power grid generating electrical energy when the at least one gas turbine engine is not operating, the electrical generator generating electrical energy when the at least one gas turbine engine is idling, and the braking system generating electrical energy when braking;

a resistive grid to transform the electrical energy from the at least one of a plug-in, electrical generator, and braking system into thermal energy by resistive dissipation; and at least one heat block in thermal communication with the resistive grid to absorb the thermal energy, wherein the at least one heat block is in thermal communication with the at least one gas turbine engine; and wherein the electrical energy from the at least one of a plug-in, electrical generator, and braking system is generated by a mechanical-to-electrical conversion device that is in electrical communication with an electrical bus which is in electrical communication with one or more traction motors that are in mechanical communication with one or more vehicle axles and wherein the electrical energy from the at least one of a plug-in, electrical generator, and braking system is generated by the mechanical-to-electrical conversion device and the one or more traction motors, wherein, in a first mode, the one or more traction motors produce substantially no electrical energy from the at least one of a plug-in, electrical generator, and braking system and, in a second mode, the one or more traction motors are operated as retarder generators to generate the electrical energy from the at least one of a plug-in, electrical generator, and braking system in response to braking, and, in a third mode, the mechanical-to-electrical conversion device generates the electrical energy from the at least one of a plug-in, electrical generator, and braking system.

\* \* \* \* \*